United States Patent
Sakamoto

(10) Patent No.: US 7,464,469 B2
(45) Date of Patent: *Dec. 16, 2008

(54) VEHICLE BEARING WHEEL UNIT

(75) Inventor: Junshi Sakamoto, Kanagawa (JP)

(73) Assignee: NSK Ltd., Fujisawa (JP)

( * ) Notice: Subject to any disclaimer, the term of this patent is extended or adjusted under 35 U.S.C. 154(b) by 470 days.

This patent is subject to a terminal disclaimer.

(21) Appl. No.: 11/213,116

(22) Filed: Aug. 26, 2005

(65) Prior Publication Data

US 2005/0278953 A1  Dec. 22, 2005

Related U.S. Application Data

(60) Division of application No. 10/914,976, filed on Jul. 30, 2004, now abandoned, which is a continuation of application No. PCT/JP03/00727, filed on Jan. 27, 2003.

(51) Int. Cl.
*B23P 17/00* (2006.01)

(52) U.S. Cl. .................................. 29/898.061

(58) Field of Classification Search ................ 384/520, 384/535, 539, 540, 544; 180/254; 82/1.11; 29/898.04, 898.061, 898.07, 898.13, 894.362, 29/894.36, 724

See application file for complete search history.

(56) References Cited

U.S. PATENT DOCUMENTS

| | | | |
|---|---|---|---|
| 4,046,433 A | * | 9/1977 | Kiener ....................... 384/540 |
| 4,437,536 A | * | 3/1984 | Colanzi et al. ............. 180/254 |
| 5,855,444 A | | 1/1999 | Ohlson et al. |
| 6,212,981 B1 | * | 4/2001 | Brinker et al. ............. 82/1.11 |
| 6,250,814 B1 | * | 6/2001 | Tajima et al. .............. 384/544 |
| 6,309,110 B1 | | 10/2001 | Tajima et al. |
| 6,357,925 B2 | * | 3/2002 | Tajima et al. .............. 384/544 |
| 6,364,426 B1 | | 4/2002 | Horne et al. |
| 6,702,398 B2 | | 3/2004 | Laps |
| 2002/0003071 A1 | | 1/2002 | Torii et al. |

FOREIGN PATENT DOCUMENTS

| | | |
|---|---|---|
| EP | 1 470 936 | 10/2004 |
| JP | 57-194103 | 11/1982 |
| JP | 58-76303 | 5/1983 |
| JP | 62-82201 | 5/1987 |
| JP | 9-503275 | 3/1997 |
| JP | 2000-234624 | 8/2000 |
| JP | 2001-233011 | 8/2001 |
| JP | 2002-19405 | 1/2002 |

OTHER PUBLICATIONS

International Search Report dated Mar. 25, 2003.
Translation of International Preliminary Examination Report dated Jan. 9, 2004.

* cited by examiner

*Primary Examiner*—George Manuel
(74) *Attorney, Agent, or Firm*—Katten Muchin Rosenman LLP

(57) ABSTRACT

The rotor of a braking apparatus is fitted onto a cylindrical positioning portion 19a, and in this condition, fixed to the hub 8a using bolts which are threaded into the screw holes 11a in the rotating flange 10a, and tightened. As the hub 8a rotates, the runout in the radial direction of the outer peripheral surface 20a of the cylindrical positioning portion 19a is controlled up to 15 μm, to suppress the runout of the vehicle wheel. With this construction, running performance such as riding comfort and diving stability is improved.

2 Claims, 3 Drawing Sheets

VEHICLE BEARING WHEEL UNIT

CROSS-REFERENCE TO RELATED APPLICATION

This application is a divisional of and claims priority to U.S. Ser. No. 10/914,976 field Jul. 30, 2004, now abandoned which is a continuation of International Application No. PCT/JP03/00727 filed on Jan. 27, 2003, all of which are hereby incorporated in their entirety by reference herein in its entirety as if fuilly set forth herein.

TECHNICAL FIELD OF THE INVENTION

This invention relates to an improvement of a bearing unit for wheel that supports an automobile wheel such that it can rotate freely with respect to a suspension apparatus. More particularly, this invention is directed to a construction in which the rotating braking member is attached to a rotating flange formed around the outer peripheral surface of the hub, such that the bolts are inserted through the holes in the rotating member for braking and into screw holes that are formed in the rotating flange for screw-fixing.

BACKGROUND

With construction as shown in FIG. 3, for example, the wheel rim 1 of an automobile wheel and the rotor 2 of a disc-brake for brake apparatus are supported by the knuckle 3 of the suspension apparatus such that they can rotate freely. In other words, the outer race 6 of the bearing unit 5 for wheel, which is the object of this invention, is fastened to the circular support-hole section 4 formed on the knuckle 3 using a plurality of bolts 7. On the other hand, the wheel rim 1 and rotor 2 are attached and fastened to the hub 8 of the bearing unit 5 for wheel by a plurality of bolts 9. In order to do this, a rotating flange 10 is formed on the portion of the outer peripheral surface on the outer end section of the hub 8 that protrudes from the outer race 6. (Here, the "outer" in the axial direction is the outside in the width direction when the bearing unit is assembled into the automobile, and is the left side in the drawings; and the "inner" in the axial direction is the center side in the width direction and is the right side in the drawings. This is the same for all the drawings of this disclosure.), and screw holes 11 are formed at a plurality of locations (generally 4 to 6 locations) that are evenly spaced around in the circumferential direction of a single circumference near the outer peripheral edge of the rotating flange 10. Also, through holes 12, 13 are formed in both the wheel rim 1 and rotor 2 in the portion near the inner peripheral edge that corresponds to the screw holes 11. When attaching and fastening the wheel rim 1 and rotor 2 to the hub 8, the bolts 9 are inserted through both of the through holes 12, 13 from the outer side toward the inner side, then screwed into the screw holes 11 and tightened.

Moreover, a plurality of rows of outer-race tracks 14a, 14b are formed around the inner peripheral surface of the outer race 6, and a stationary flange 15 is formed around the outer peripheral surface of the outer race 6. This outer race 6 is fastened to the knuckle 3 by connecting the stationary flange 15 to the knuckle 3 using bolts 7. On the other hand, the hub 8 comprises a hub body 16 and an inner race 17 that is combined with the hub body 16. The rotating flange 10 is formed on part of the outer peripheral surface of the hub body 16 in the section that protrudes from the opening on the outer end of the outer race 6. Also, a cylindrical positioning portion 19 is formed on the surface of the outer end of the hub body 16. The outer peripheral surface 20 of this cylindrical positioning portion 19 is concentric with the hub body 16.

The wheel rim 1 and rotor 2 having their inner peripheral edge sections fitted onto this cylindrical positioning portion 19, are attached to and fastened to the surface on one side of the rotating flange 10 (the outer surface in the example shown in the figure) using the bolts 9. In this state, the wheel rim 1, rotor 2 and hub 8 are all concentric with each other. Moreover, with the rows of outer-race tracks 14a, 14b, the outer-race track 14a is located on the outer side while the outer-race track 14b is located on the inner side, and a first inner-race track 21 is formed directly around the outer surface in the middle section of the hub body 16 in the section that faces the outer-race track 14a on the outer side. Furthermore, a small diameter stepped section 22 is formed around the outer peripheral surface of the inner end section of the hub body 16, and an inner race 17 is fastened onto the small-diameter stepped section 22 to form the hub 8. A second inner-race track 23 is formed around the outer peripheral surface of this inner race 17 to face the outer-race track 14b on the inner side.

There is a plurality of rolling bodies, or balls 24, 24 located between each of the outer-race tracks 14a, 14b and first and second inner-race tracks 21, 23, and they are held by retainers 25, 25 such that they can roll freely. With this construction, a double-row angular ball bearing in a back-to-back combination is constructed, to support the hub 8 inside the outer race 6 such that it rotates freely, and to support radial loads and thrust loads. There are seal rings 26a, 26b located between the inner peripheral surface on both ends of the outer race 6 and the outer peripheral surface around the middle section of the hub body 16 and the outer peripheral surface around the inner end of the inner race 17, so that they seal off the internal space, where the balls 24, 24 are located, from the outside. Furthermore, the example shown in the figures is directed to a bearing unit 5 for the driven wheels of an automobile (rear wheels in the case of a FR and RR automobile, the front wheels in the case of a FF automobile and all of the wheels in the case of a 4WD automobile), so a spline hole 27 is formed in the center of the hub body 16. A constant velocity joint 28 having a spline shaft 29 is provided, and the spline shaft 29 of the constant-velocity joint 28 is inserted into this spline hole 27.

As shown in FIG. 3, when the bearing unit 5 for vehicle wheel described above is in use, the outer race 6 is fastened to the knuckle 3, and the wheel rim 1 and the rotor 2 with tire (not shown in the figure) mounted to the wheel rim 1 are fastened to the rotating flange 10 of the hub body 16. When doing this, as described above, the wheel rim 1, rotor 2 and hub 8 become concentric with each other by fitting the inner peripheral edges of the wheel rim 1 and rotor 2 onto the cylindrical positioning portion 19. Also, of these, the rotor 2 is combined with a support and caliper (not shown in the figure) fixed to the knuckle 3, to form a disc brake for braking. When braking, a pair of pads located on both sides of the rotor 2 presses against the both side surfaces of the rotor 2.

In the construction described above, in order to prevent the rotor 2 from whirling (the outer peripheral edge of the rotor 2 runs out in the radial direction as the rotor 2 turns) when moving, the geometric center of the rotor 2 must coincide with the center of rotation of the hub 8. On the other hand, in the case of a so-called third-generation bearing unit for vehicle wheel where the first inner-race track 21 is formed directly around the outer peripheral surface of the middle section of the hub 8, as shown in FIG. 3, a stepped shape is formed between the middle section in the axial direction of the hub body 16 where the first inner-race track 21 is formed, and the small-diameter stepped section 22 around which the inner race 17 having the second inner-race track 23 is fitted for fixing. In the case of this construction, as the parallelism and concentricity of the first and second inner-race tracks 21, 23 becomes poor, it becomes easy for the geometric center and the center of rotation of the hub 8 to come out of alignment. When these centers come out of alignment, it becomes easy for the outer peripheral surface 20 around the cylindrical positioning portion 19 formed on the outer end surface of the hub 8 to whirl with runout in the radial direction as the hub 8 rotates.

When the outer peripheral surface 20 around the cylindrical positioning portion 19 whirls because of this reason, the rotor 2 that is fitted around this cylindrical positioning portion 19 begins to whirl with runout in the radial direction. As a result, even though the wheel balance is secured with respect to the vehicle wheel, the rotating balance when actually moving becomes poor, and driving performance when traveling at high speed, which is based on comfort and driving stability, becomes poor. Particularly, in the structure where the work of attaching and fastening the rotor 2 to the rotating flange 10 is performed by screwing in and tightening bolts 9 in the screw holes 11 formed in the rotating flange 10, it becomes easy for the rotor 2 to be affected by whirling of the outer peripheral surface 20 around the cylindrical positioning portion 19.

The bearing unit for vehicle wheel according to the present invention is invented, taking such background into consideration, to suppress runout in the radial direction of the rotor 2 or rotating member for braking such as brake drum based on the rotation of the hub 8.

SUMMARY OF THE INVENTION

The bearing unit for vehicle wheel of this invention is for supporting a vehicle wheel and rotating member for braking on the suspension apparatus such that it can rotate freely, and it comprises: a non-rotating outer race, a hub that rotates on the radially inside of the outer race, and a plurality of rolling elements.

The outer race has two rows of outer-race tracks formed around its inner peripheral surface, and when in operation, it is supported by the suspension so as not to rotate. Also, the hub comprises a combination of a hub body and one inner race.

The hub body comprises: a rotating flange that is formed around the outer peripheral surface on the outer end of the hub body, in order to support the vehicle wheel and rotating member for braking, and has screw holes for fastening the vehicle wheel and rotating member for braking; a first inner-race track that is formed directly around the outer peripheral surface in the middle section of the hub body to face the outer-race track on the outer side of the two outer-race tracks; and a cylindrical positioning portion that is provided on the outer end surface of the hub body, and around which the inner peripheral edge of the rotating member for braking is fitted.

Moreover, the inner race has a second inner-race track formed around its outer peripheral surface so as to face the outer-race track on the inner side of the two outer-race tracks, and the inner race is fitted around the inner end section of the hub body.

Furthermore, a plurality of the rolling elements are located between each of the outer-race tracks and inner-race tracks such that they can roll freely.

Particularly, in the case of the bearing unit for vehicle wheel of this invention, as the hub rotates, the runout is only 15 µm or less in the radial direction at least in the part of the outer peripheral surface of the cylindrical positioning portion onto which the rotating member for braking is fitted. The cylindrical positioning portion is located on the outer end of the hub.

In the case of the bearing unit for vehicle wheel of this invention constructed as described above, the geometric center of the rotating member for braking that is fitted around the cylindrical positioning portion coincides with the center of rotation of the hub, so as to suppress whirling of the rotating member for braking, so that it is possible to improve the driving performance of the automobile, mainly based on riding comfort and driving stability.

DETAILED DESCRIPTION OF THE INVENTION

Figure 1:
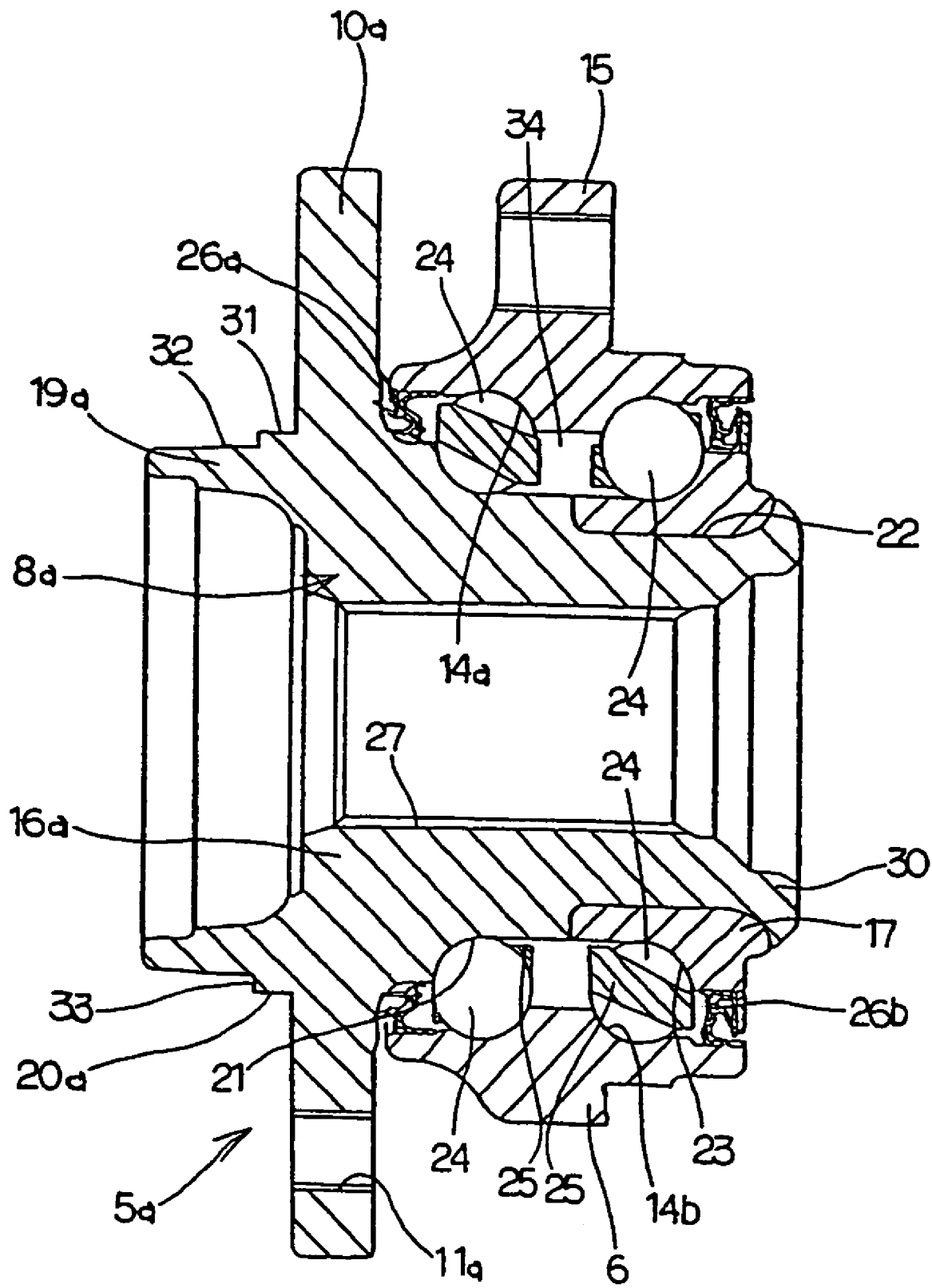
FIG. 1 is a cross-sectional drawing of a first example of the embodiment of the invention.
Figure 3:
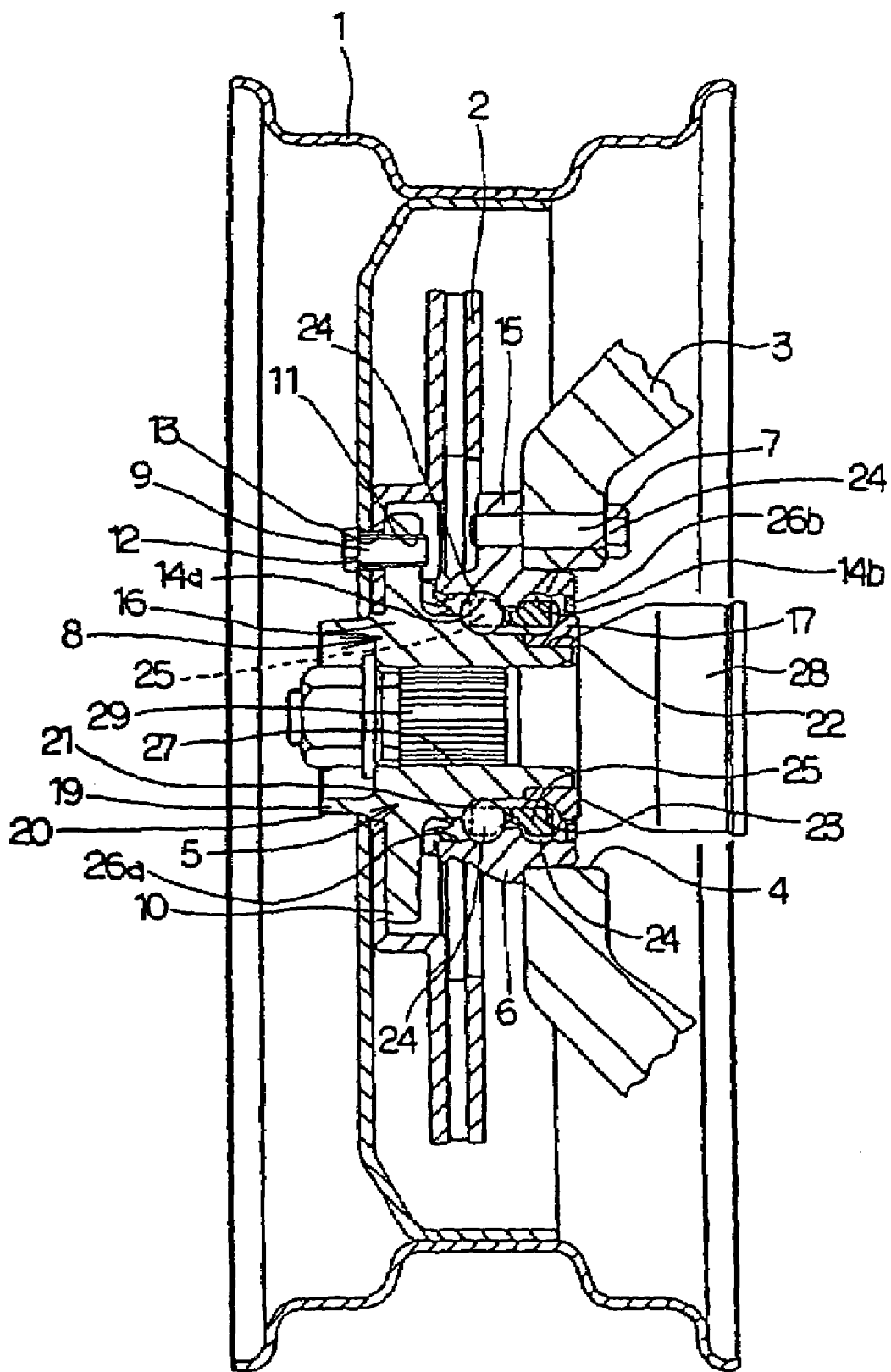
FIG. 3 is a cross-sectional drawing showing an example of the installation of the bearing unit for vehicle wheel to which this invention is applied.

FIG. 1 shows a first example of the embodiment of the invention. In the bearing unit 5a for vehicle wheel according to this example, there is a stationary flange 15 formed around the outer peripheral surface in the middle section of the outer race 6 for attaching and securing the outer race 6 to a knuckle 3 (see FIG. 3). Also, there are two rows of outer-race tracks 14a, 14b formed around the inner peripheral surface of the outer race 6. Moreover, with respect to the hub 8a, a first inner-race track 21 and a second inner-race track 23 are formed around the outer peripheral surfaces of the hub body 16a and the inner race 17, such that they respectively face the outer-race tracks 14a, 14b.

In other words, a first inner-race track 21 is formed directly around the outer peripheral surface in the middle section of the hub body 16a, and an inner race 17 is fitted around a small-diameter stepped section 22 that is formed around the section near the inner end of the hub body 16a, and a second inner-race track 23 is formed around the outer peripheral surface of the inner race 17. Also, in order to prevent the inner race 17 from coming apart from the small-diameter stepped section 22, a crimped section 30 is formed around the inner end of the hub body 16a. That is, after the inner race 17 has been fitted onto the small-diameter stepped section 22, the section on the inner end of the hub body 16a that protrudes from the inner end surface of the inner race 17 is plastically deformed outward in the radial direction to form a crimped section 30, and this crimped section 30 holds the inner end surface of the inner race 17. With this construction, the inner race 17 is securely fastened around the inner end section of the hub body 16a to form the hub 8a. Moreover, a rotating flange 10a for attaching to the wheel rim 1 and the rotor 2 or drum, which is the rotating body of the brake (see FIG. 3), is formed around the outer peripheral surface near the outer end of the hub body 16a, in the section that protrudes from the opening on the outer end of the outer race 6. Screw holes 11a are formed at a plurality of locations around this rotating flange 10a in the circumferential direction on the circumference the center of which is located on the rotating center of the hub body 16a. These screw holes 11a are for screwing in the bolts 9 (see FIG. 3) that fasten the wheel rim 1 and rotor 2.

Also, there is a cylindrical positioning portion 19a formed on the outer end surface of the hub body 16a, in order that the wheel rim 1 and rotor 2 are fitted around and supported by the cylindrical positioning portion 19a such that the cylindrical positioning portion 19a is concentric with the hub body 16a. In this example, of the outer peripheral surface 20a around the cylindrical positioning portion 19a, provided on the based end section (inner end section) is a large-diameter section 31 around which the inner peripheral edge section of the rotor 2 is fitted, and provided from the middle section to the tip end section (outer end section) is a small-diameter section 32 around which the inner peripheral edge section of the wheel rim 1 is fitted. The large-diameter section 31 and the small-diameter section 33 are concentric with each other, and are connected by a stepped section 33. Moreover, there is a plurality of balls 24, 24 located between each of the outer-race tracks 14a, 14b and first and second inner-race tracks 21, 23, and they are held by retainers 25, 25 such that they can roll freely. There is a pair of sealing rings 26a, 26b located between the inner peripheral surface on both end sections of the outer race 6 and the outer peripheral surface around the middle section of the hub body 16a and the outer peripheral surface around the inner end section of the inner race 17, so as to cutoff the internal space 34, where the balls 24, 24 are located, from the outside and to prevent the grease filled inside this internal space 34 from leaking, as well as to prevent foreign matter from getting inside this internal space 34.

The outer peripheral surface 20a (large-diameter section 31 and small-diameter section 32) around the cylindrical positioning portion 19a of the bearing unit 5a for vehicle wheel described above runs out in the radial direction as the hub 8a rotates on the inner diameter side of the outer race 6. In the case of the bearing unit 5a for vehicle wheel of this invention, this runout is kept to 15 μm or less. In other words, when the outer race 6 is secured and the probe of a displacement sensor is in contact with the outer peripheral surface 20a and the hub 8a is allowed to rotate, the precision in dimensions and shape of the outer peripheral surface 20a with respect to the center of rotation of the hub 8a is provided such that the runout of the values measured by the displacement sensor (difference between the maximum value and minimum value) is 15 μm or less. In this invention, it is acceptable if the runout of at least the small-diameter section 32 of the outer peripheral surface 20a, is kept to 15 μm or less (the runout of just the small-diameter section 32 is controlled to be 15 μm or less), however, it is preferred that in addition to the small-diameter section 32, that the runout of the large-diameter section 31 also be kept to 15 μm or less.

In addition to improving the precision of the shape and dimensions of all of the components of the bearing unit 5a for vehicle wheel, the work of securing the precision of the outer peripheral surface 20a in this way can be performed by finishing the outer peripheral surface 20 of the cylindrical positioning portion 19a after assembling the bearing unit 5a for vehicle wheel. Of these, the work of performing a finishing process after assembly is performed by turning, grinding, or micro-finishing the outer peripheral surface 20a to finish the outer peripheral surface 20a into a cylindrical surface that is concentric with the center of rotation of the hub 8a. In this case, before performing turning, grinding or micro-finishing of the outer peripheral surface 20a of the cylindrical positioning portion 19a, all of the components of the bearing unit 5a for vehicle wheel except for the outer peripheral surface 20a of the cylindrical positioning portion 19a are processed to a specified shape and dimension. Also, the outer peripheral surface 20a of the cylindrical positioning portion 19a is processed to a rough shape and dimensions. Next, the components of the bearing unit 5a for vehicle wheel are assembled to the state as shown in FIG. 1. After that, the hub 8a is rotated with the outer race 6 fixed, and the turning, grinding or micro-finishing of the outer peripheral surface 20a is performed. In any case, in the bearing unit 5a for vehicle wheel of this example, the amount of whirling of the outer peripheral surface 20a (especially the small-diameter section 31) of the cylindrical positioning portion 19a, which is formed on the outer end surface of the hub body 16a and around which the rotor 2 (see FIG. 3) is fitted, is kept to 15 μm or less, so it is possible to suppress whirling of the rotor 2 during operation, and thus it is possible to improve the driving performance of the automobile such as riding comfort and driving stability.

In other words, according to experimentation performed by the inventors, as shown in the Table below, the amount of whirling is 20 μm or more, the driving performance of the automobile such as riding comfort and driving stability was never good, however, when the amount of whirling was kept to 15 μm or less, the driving performance became good.

TABLE 1

| Whirling Amount (μm) | Evaluation |
| --- | --- |
| 50 | x |
| 30 | x |
| 20 | x |
| 15 | ○ |
| 10 | ○ |

Figure 2:
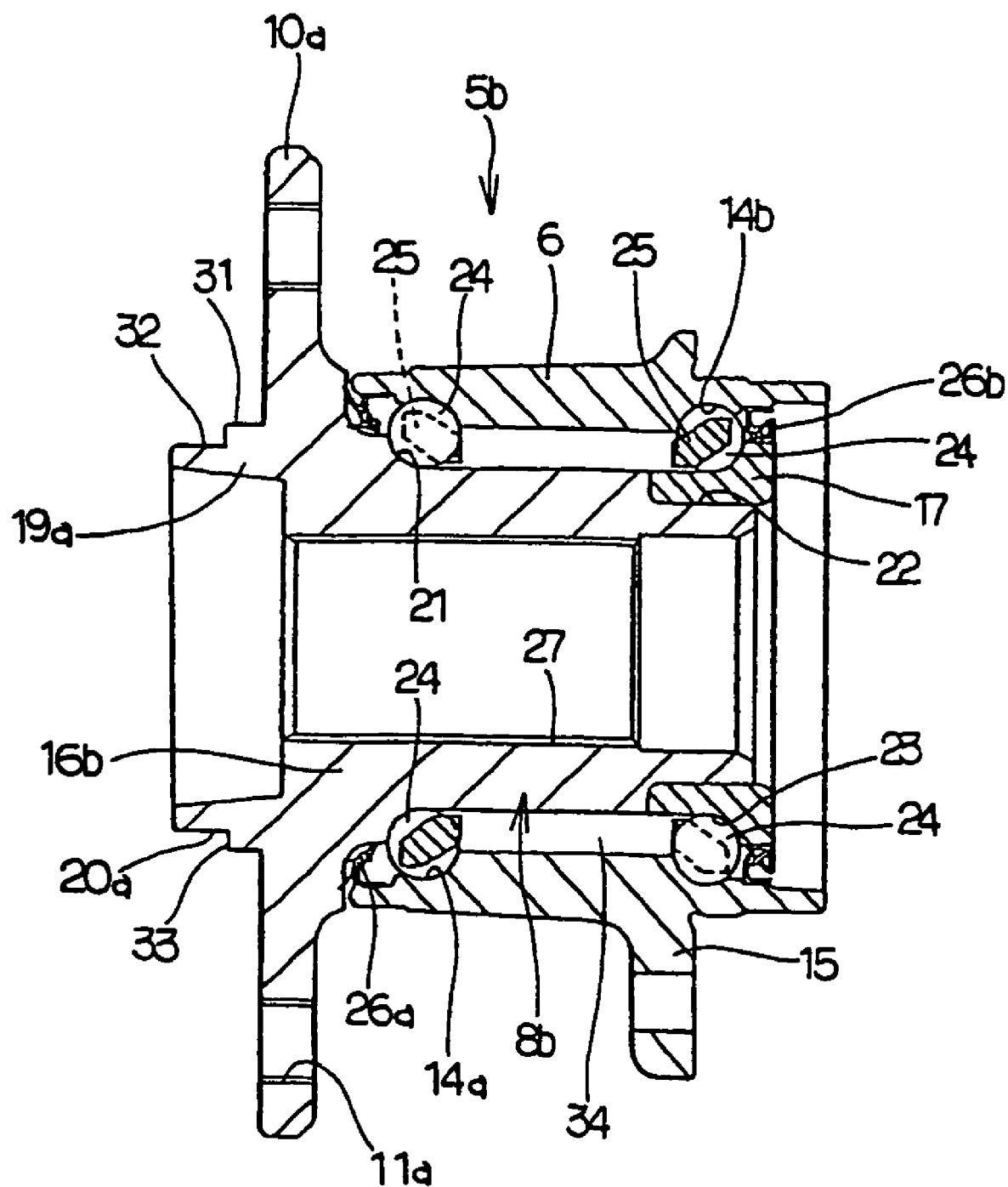
FIG. 2 is a cross-sectional drawing of a second example of the embodiment of the invention.

Next, FIG. 2 shows a second example of the embodiment of the invention. In the case of the bearing unit 5b for vehicle wheel in this example, an inner ring 17 is fitted on the small-diameter step portion 22 at the inner end of the hub body 16b of the hub 8b, and the inner end of the inner ring 17 is projected inward of the inner end surface of the hub body 16b. In the state when it is installed in the vehicle, the inner end surface of the inner ring 17 is abutted with the outer end surface of the constant velocityjoint 28 (FIG. 3) so as to prevent the inner ring 17 from coming out of the hub body 16b. The other construction and function are similar to those of the case of the first example, and so redundant explanation is omitted. Incidentally, the present invention is not limited to the bearing unit for driven wheel as shown, and can be applied to the bearing unit for non-driven wheel.

The bearing unit for vehicle wheel according to this invention, is constructed and functions as described above, and makes it possible to improve driving performance such as comfort and stability when driving at high speed.

The invention claimed is:

1. A manufacturing method of a bearing unit for rotatably supporting a vehicle wheel and a rotating member for braking on a suspension, which comprises an outer race not rotatable during use, a hub rotating on an inner diameter side of the outer race, and a plurality of rolling elements; the outer race having an inner peripheral surface formed with a double row of outer-race tracks and supported by the suspension; the hub comprising a hub body and an inner race; the hub body provided with a rotating flange formed around an outer peripheral surface of an outer end thereof, so as to support the vehicle wheel and the rotating member for braking, and having screw holes for fastening the vehicle wheel and the rotating member for braking, a first inner-race track formed directly around the outer peripheral surface in a middle section of the hub body to face the first outer-race track on an outer side of the outer-race tracks, and a cylindrical positioning portion formed on an outer end surface of the hub body, and around which an inner peripheral edge of the rotating member for braking is fitted; the inner race provided with a second inner-race track formed on an outer peripheral surface thereof to face a second outer-race track on an inner side of the outer-race tracks, and being fitted around an inner end section of the hub body; and the rolling elements rotatably located between the each of the outer-race tracks and each of the inner-race tracks, comprising:

assembling the bearing unit for a vehicle wheel, and then finishing the outer peripheral surface of the cylindrical positioning portion, such that the runout in the radial direction at least in the part of the outer peripheral surface of the cylindrical positioning portion onto which the rotating member for braking is fitted, is controlled.

2. The manufacturing method described in claim 1, wherein the finishing process is selected from either of turning, grinding and micro-finishing.

* * * * *

UNITED STATES PATENT AND TRADEMARK OFFICE
CERTIFICATE OF CORRECTION

PATENT NO.        : 7,464,469 B2                                   Page 1 of 1
APPLICATION NO. : 11/213116
DATED             : December 16, 2008
INVENTOR(S)       : Junshi Sakamoto It is certified that error appears in the above-identified patent and that said Letters Patent is hereby corrected as shown below:

The following is added to the title page of the patent in the left column:

item -- (30)    Foreign Application Priority Data

Jan. 30, 2002 (JP) ..........................2002-021342 --

Signed and Sealed this

Twenty-first Day of April, 2009

JOHN DOLL
*Acting Director of the United States Patent and Trademark Office*